Figure 1:
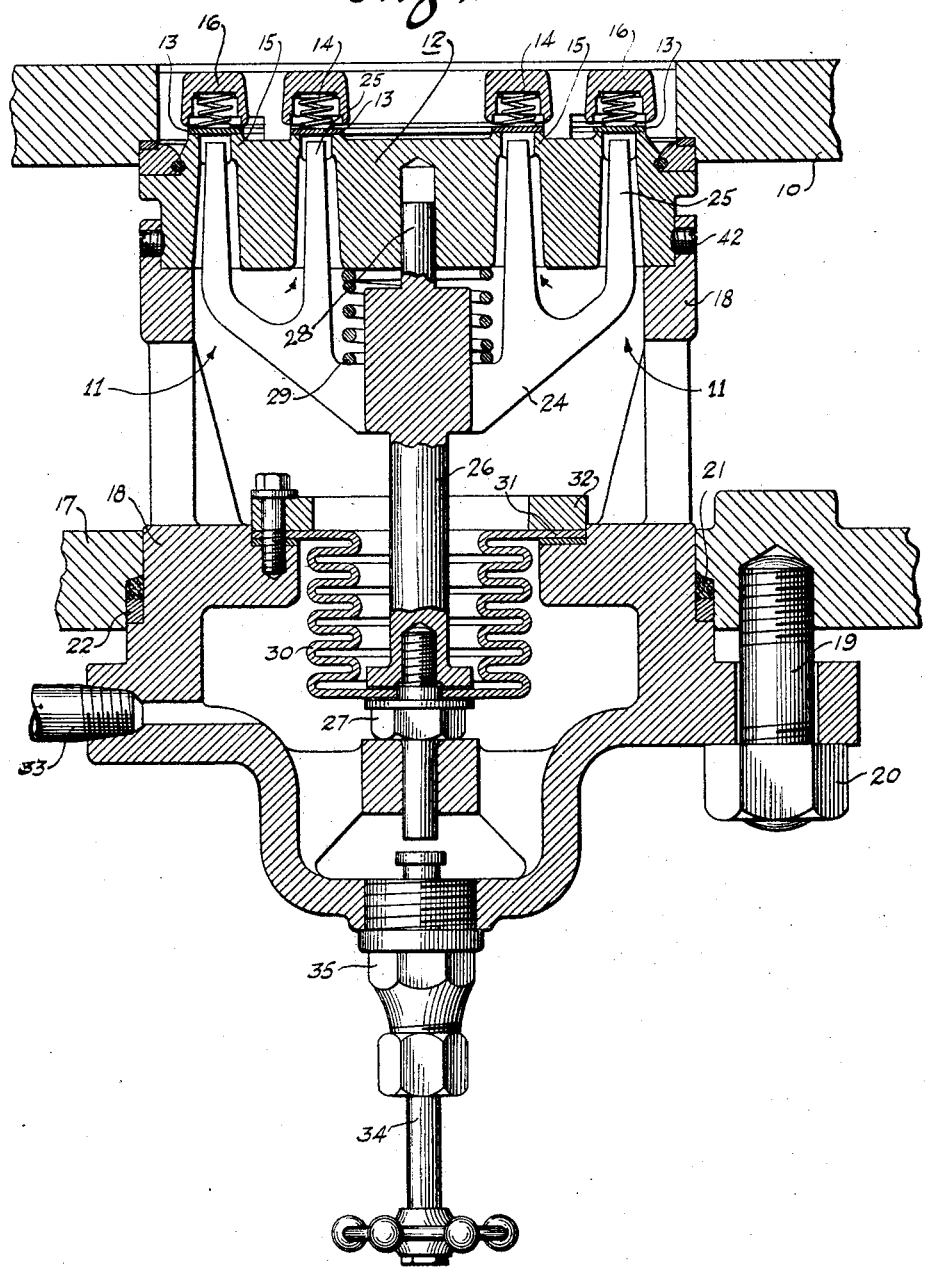

Nov. 15, 1932.  E. NATHAN  1,887,858
UNLOADER VALVE FOR COMPRESSORS
Filed Sept. 20, 1930  2 Sheets-Sheet 1

INVENTOR
Ellis Nathan
BY
Joseph F. Schofield
ATTORNEY

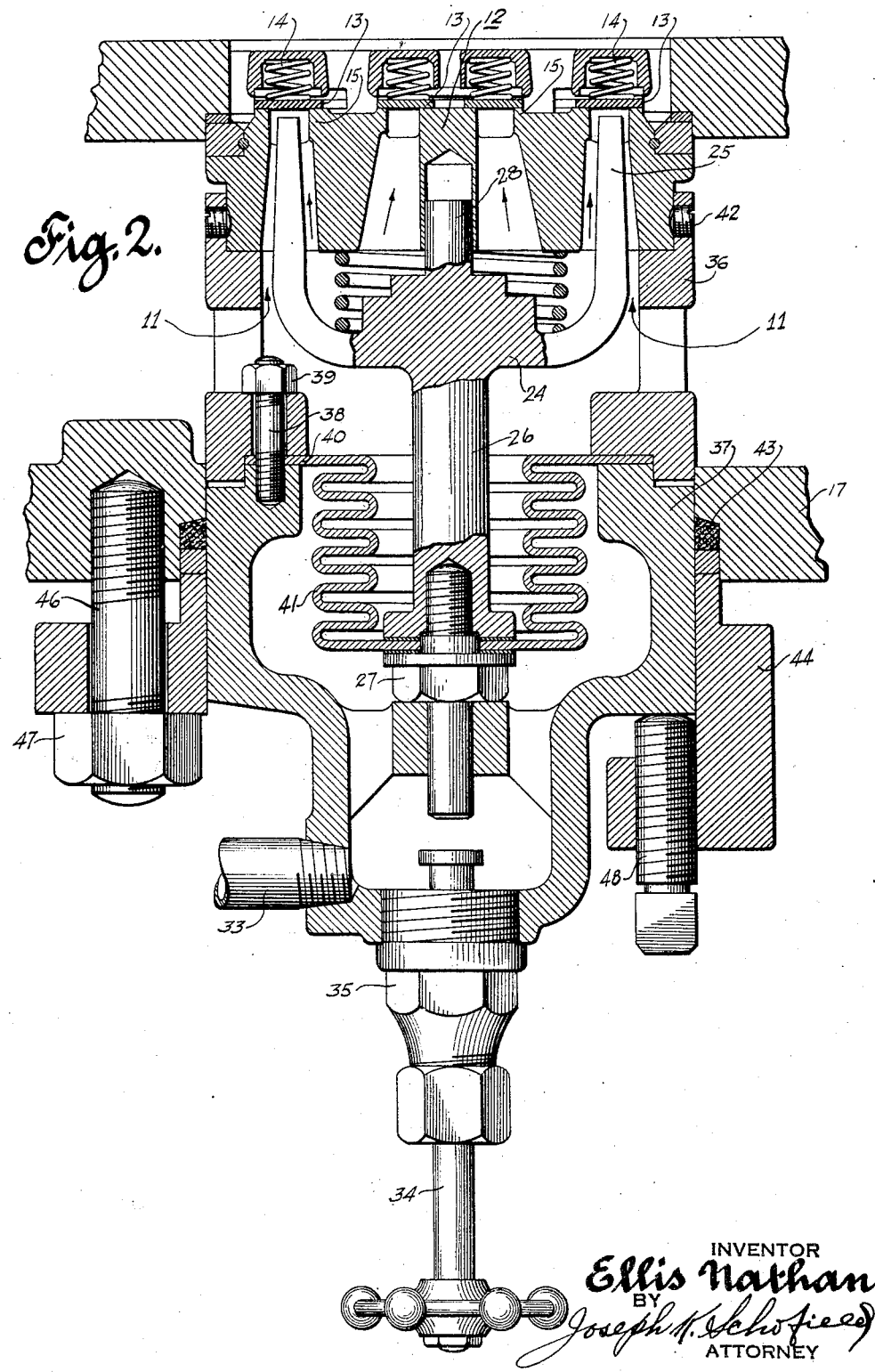

UNITED STATES PATENT OFFICE

ELLIS NATHAN, OF EASTON, PENNSYLVANIA, ASSIGNOR TO PENNSYLVANIA PUMP & COMPRESSOR COMPANY, OF EASTON, PENNSYLVANIA, A CORPORATION OF PENNSYLVANIA

UNLOADER VALVE FOR COMPRESSORS

Application filed September 20, 1930. Serial No. 483,341.

This invention relates to air compressors and in particular to a valve construction therefor adapted to be moved toward and held in its open position to effect unloading of a compressor.

An object of importance of the present invention is to provide improved means movable within the unloader valve structure which may be forced by fluid pressure or manually into a position holding the inlet valve away from its seat.

Another object of the invention is to provide improved guiding means for the member movable into and out of contact with the valve.

And finally it is an object to improve the construction of the valve supporting structure to facilitate manufacture, assembly, and mounting of the structure within the cylinder walls of a compressor.

With the above and other objects in view, my invention consists in the features of construction and operation set forth in the following specification and illustrated in the accompanying drawings.

In the accompanying drawings annexed hereto and forming a part of this specification, I have shown my invention embodied in an inlet valve of the plate type, but it will be understood that the invention can be otherwise embodied and that the drawings are not to be construed as defining or limiting the scope of the invention, the claims appended to this specification being relied upon for that purpose.

In the drawings:

Figure 1 is a vertical central sectional view of a complete inlet valve structure illustrating one form of the invention, and Fig. 2 is a similar view of a modified form of the invention.

In the above mentioned drawings I have shown two embodiments of the invention which are now deemed preferable, but it is to be understood that changes and modifications may be made within the scope of the appended claims without departing from the spirit of the invention.

Briefly, and in its preferred aspect, my invention may include the following principal parts: First, a valve assembly; second, a yoke member movable into and out of contact with a valve within said assembly; third, a supporting frame for retaining said valve assembly and yoke member in position within a cylinder wall; fourth, a guide member formed on the yoke member; fifth, a flexible diaphragm attached to and permitting movement of said yoke member relative to the supporting members; and sixth, means for admitting fluid pressure within the support and against said diphragm to move said yoke member against the valve and force the valve to its open or inoperative position.

Referring more in particular to the figures of the drawings, the cylinder wall 10 of a compressor is shown adjacent an intake passage 11 within which is adapted to be fitted the inlet valve assembly 12. This assembly 12 may have one or more valves 13 of ring form normally forced against a valve seat 15 by springs 14 housed within a valve cover plate 16. As this assembly 12 may be of a standard or usual form, further description is thought to be unnecessary.

To support the valve assembly 12 in position a structure is provided engaging the periphery of the valve seat 15 and extending through the outer wall 17 of the intake passage 11. Referring first to the form of the invention shown in Fig. 1, the supporting structure is formed in one piece 18 and may be clamped to the outer wall 17 over studs 19 threaded into the wall 17 by suitable nuts 20. A packing 21 is inserted within the opening of the outer wall 17 in a counter-bored portion. This packing 21 may be retained by a suitable ring 22 engaged by and forced into position by an annular surface on the support 18. By tightening the nuts 20 upon the studs 19 the support 18 is forced against and firmly retains the valve assembly 12 in its position against the cylinder wall 10. The tightening of the nuts 20 also compresses the packing 21 within its annular recess assuring a joint satisfactory for the low pressure cylinders or under other conditions where the packing 21 has to withstand but small pressure differences.

Within the support 18 extends a yoke member 24 having fingers 25 extending through the openings of the valve seat 15 to engage the valve plates 13. On this yoke member 24 is an elongated guide portion 26 preferably formed integrally therewith. A central extension 28 enters a hole within the valve seat 15 and serves to guide the upper end and the fingers 25 of this member 24. To guide the opposite end of this member 24 an extension member 27 threaded into the lower end is adapted to extend freely through an opening within the supporting member 18. By these means at the opposite ends of the guide portion 26 of the yoke member 24 the fingers 25 may be freely moved into and out of engagement with the lower surface of the valve plate or plates 13 to retain the valve plates 13 in their open position.

Normally retaining the yoke member 24 in a position in which the fingers 25 are out of contact with the valve plates 13 is a spring 29. This spring 29 is shown as of the helical type disposed between the lower surface of the valve seat 15 and the lower ends of the fingers 25.

In order to move the yoke member 24 in a direction to engage the fingers 25 with the valve plates 13 fluid pressure means are provided. Within an outer portion of the support 18 is mounted a flexible diaphragm 30, one of its surfaces being fastened to the support 18 and another to the yoke member 24. In its preferred form this flexible diaphragm or member 30 takes the form of a metallic bellows. As one end is the outwardly extending flange 31 fastened by means of a clamping ring 32 to an inner face of the support 18. The opposite end of the bellows, which in the form shown has an inwardly extending flange, is attached to the end of the guide portion 26 of the yoke member 24 by the member 27 threaded therein. The bellows 30 with its clamping ring 32 encloses a portion of the support 18 and forms a pressure tight cavity therein. At one side of this enclosed portion of the support 18 is an opening 33 through which fluid pressure may be admitted to compress the bellows 30 thus moving the yoke member 24 to engage and hold the valve plates 13 in their open or inoperative position. As soon as pressure within the enclosed portion of the support 18 is released, the coiled spring 29 expands, forcing the yoke member 24 in a direction away from the valve seat 15 so that the valve plates 13 are free to function normally.

Supplemental manual means to move the yoke member 24 to engage the valves 13 and render them inoperative are provided which may be of the usual type. A stem 34 threaded into a member 35 threaded into the outer end of the support 18 may be rotated by its wheel handle to force the inner end of the stem 34 into engagement with the end of the guide member extension 27.

Referring now to the embodiment of the invention shown in Fig. 2, it will be seen that the support for the valve assembly 12 is formed of two principal members 36 and 37 clamped firmly together. For this purpose studs 38 are threaded into one member 37 and extend through the other member 36. Nuts 39 on the outer end of the studs 38 fasten the members 36 and 37 together accurately in alignment. These studs 38 also clamp the flange 40 of the flexible bellows 41 between the members 36 and 37. The member 36 adjacent the valve assembly 12 is or may be fastened thereto by small set screws 42 sufficiently to retain these parts in proper relation during assembly and disassembly.

In order to retain the valve assembly 12 and its supporting members 36 and 37 in their operative positions, the following means may be provided. The outer member 37 of the support fits within the outer wall 17 of the cylinder, a packing 43 similar to packing 21 being inserted within a counterbored portion of the opening therefor. Surrounding the member 37 is a packing gland 44 which may be drawn down against the cylinder wall 17 by appropriate studs 46 and nuts 47. On this gland 44 are set screws 48, one only of which is shown, positioned over the outer end of the supporting member 37. By means of the studs 46 for the gland 44 and set screws 48 on the gland 44 for forcing the supporting member 37 against the valve assembly 12 a completely tight joint may be obtained by the packing 43. The degree of tightness of this packing 43 is determined entirely by the position of the gland 44 and independently of the position of the supporting members 36 and 37 against the valve assembly 12. This form of the invention is therefore adapted for intermediate or high pressures. As the bellows 41, the yoke member 24, valve assembly 12, and manual unloading means 34 are or may be in every way similar to those shown and described in connection with Fig. 1, further description of these parts is not thought to be necessary.

Extending through the support 18 in Fig. 1 and through member 36 of the support shown in Fig. 2 are the usual openings for the air being compressed to pass from the intake passage 11 to the spaces within the valve seat 15.

What I claim is:

1. An unloader valve for compressors comprising in combination, a valve assembly, a support for retaining said assembly in position within a cylinder wall, a yoke member within said support having fingers extending through portions of said assembly, a guiding portion formed integrally with said yoke member having a portion engaging said assembly, and a member secured at the opposite end of said guiding portion engaging said support whereby said yoke member is guided relative to said support and assembly at axially aligned widely spaced positions.

2. An unloader valve for compressors comprising in combination, a valve assembly, a support for retaining said assembly in position within a cylinder wall, a yoke member within said support having fingers extending through portions of said assembly, a guiding means for said yoke member engaging said assembly, a flexible diaphragm attached to one portion of said yoke member, and a second guiding means for said yoke member engaging said support.

3. An unloader valve for compressors comprising in combination, a valve assembly, a support for retaining said assembly within a cylinder wall, said support comprising two members secured together and having clamped therebetween a flange of a flexible diaphragm, and a separate member surrounding a member of said support to retain said support in position against said assembly and within said cylinder wall.

4. An unloader valve for compressors comprising in combination, a valve assembly, a support for retaining said assembly in position within a cylinder wall, a flexible diaphragm within said support, a yoke member attached to said diaphragm and movable within said support through portions of said assembly, a gland of ring form surrounding said support and forming a fluid tight joint between said support and cylinder walls, and means on said gland for forcing said support within said cylinder wall and against said assembly.

5. An unloader valve for compressors comprising in combination, a valve assembly, a support for retaining said assembly within a cylinder wall, a flexible diaphragm within said support, a yoke member attached to portion of said diaphragm and movable within said support through openings within said assembly, and a clamping ring surrounding said support for forcing said support against said assembly, and a packing for forming a tight joint between said support and cylinder wall retained in position by said clamping ring.

In testimony whereof, I hereto affix my signature.

ELLIS NATHAN.